US007889891B2

(12) United States Patent
Tsukiji et al.

(10) Patent No.: US 7,889,891 B2
(45) Date of Patent: Feb. 15, 2011

(54) OBJECT DETERMINING DEVICE, IMAGING DEVICE AND MONITOR

(75) Inventors: Shuichiro Tsukiji, Santa Clara, CA (US); Koichi Kinoshita, Kyoto (JP); Miki Matsuoka, Kyoto (JP)

(73) Assignee: Omron Corporation, Kyoto (JP)

( * ) Notice: Subject to any disclaimer, the term of this patent is extended or adjusted under 35 U.S.C. 154(b) by 1274 days.

(21) Appl. No.: 11/471,575

(22) Filed: Jun. 21, 2006

(65) Prior Publication Data

US 2007/0171296 A1 Jul. 26, 2007

(30) Foreign Application Priority Data

Jun. 22, 2005 (JP) ............................ 2005-182405

(51) Int. Cl.
G06K 9/00 (2006.01)
(52) U.S. Cl. ..................................... 382/118
(58) Field of Classification Search ................. 382/118
See application file for complete search history.

(56) References Cited

U.S. PATENT DOCUMENTS

| 2002/0113862 | A1  | 8/2002 | Center, Jr. et al. |
| 2003/0071908 | A1  | 4/2003 | Sannoh et al. |
| 2004/0086157 | A1* | 5/2004 | Sukegawa ................ 382/115 |

FOREIGN PATENT DOCUMENTS

| EP | 1 471 455 A2 | 10/2004 |
| JP | 2002-333652 | 11/2002 |
| JP | 2003-323619 A | 11/2003 |
| JP | 2004-302644 A | 10/2004 |
| JP | 2005-227957 | 8/2005 |
| WO | WO 2005/073896 A1 | 8/2005 |

OTHER PUBLICATIONS

Longbin Chen et al., "Face Annotation for Family Photo Album Management," International Journal of Image and Graphics, vol. 3, No. 1, Dec. 30, 2002.

* cited by examiner

*Primary Examiner*—Vikkram Bali
*Assistant Examiner*—Elisa M Rice
(74) *Attorney, Agent, or Firm*—Dickstein Shapiro LLP

(57) ABSTRACT

An object determining device for selecting a target face for processing from plural faces in an image, includes a face detecting unit that detects faces from an image; a face information recording unit that records the face detected in the past by the face detecting unit and the detection history relating to this detection as associated with each other; and a face selecting unit that selects a target face for processing, from the faces included in the image based upon the detection history. The object determining device includes a face information updating unit that, in a case where the face detected by the face detecting unit is not present in the face information recording unit, newly registers the face, and in a case where the face is present, updates the face information.

1 Claim, 7 Drawing Sheets

Fig. 2

| Face information | Characteristic information of A | | | | | Characteristic information of B | | | | | Characteristic information of C | | | | |
|---|---|---|---|---|---|---|---|---|---|---|---|---|---|---|---|
| Thumbnail image | ☺ | | | | | ☻ | | | | | ⊡⁺⁺ | | | | |
| Detection history | Fifth times | | | | | Ten times | | | | | Three times | | | | |
| | Date and time | Size of face | Number of persons in image | Mode | | Date and time | Size of face | Number of persons in image | Mode | | Date and time | Size of face | Number of persons in image | Mode | |
| | 2005/5/1 12:00 | 15 pix | 10 | Automatic | | 2005/2/10 15:00 | 100 pix | 3 | Automatic | | 2005/3/15 12:00 | 300 pix | 1 | Manual | |
| | 2005/5/10 15:30 | 120 pix | 2 | Manual | | 2005/4/11 11:10 | 120 pix | 2 | Automatic | | 2005/5/10 15:30 | 320 pix | 1 | Manual | |
| | .. | .. | .. | .. | | .. | .. | .. | .. | | .. | .. | .. | .. | |

OBJECT DETERMINING DEVICE, IMAGING DEVICE AND MONITOR

This application claims priority to Japanese Patent Application No. 182405/2005, filed Jun. 22, 2005.

BACKGROUND OF THE RELATED ART

1. Field of the Invention

The present invention relates to a technique for determining a target face from a still image or moving image including plural faces.

2. Description of the Related Art

Conventionally, a face detecting technique is applied to an imaging device or the like and realizes a convenient function. When the face detecting technique is applied to a digital camera, for example, the camera can automatically focus the detected face. Therefore, a photograph in which the face of the subject is in focus can be more simply taken, compared to a technique for bringing the subject positioned at the center of the screen into focus.

However, in the case where plural faces are present in the image, a problem arises in which the face in the image that should be in focus cannot be specified.

In order to solve this problem, a method has conventionally been known in which information relating to looks of the face that should be detected and the priority of this face are recorded, and focusing is carried out by utilizing these factors (see Japanese Patent Application Laid-Open No. 2002-333652).

According to this method, even if plural faces are present in the image, the face that matches the face recorded beforehand as the face to be detected and that has the highest priority can be specified as the face that should be in focus.

However, the conventional technique forces a user to do a complicated operation for registering beforehand the information relating to looks of the face to be detected and the priority of this face. If the user does not do this operation, the face to which attention should be given cannot consequently be specified.

SUMMARY

In general, the invention provides a technique for specifying a target face among plural faces in an image without a need for a user to do a complicated registration operation beforehand.

A first aspect of the invention is an object determining device that selects a face, which is an object of the process, among plural faces included in an image. The process here may be, for example, a focusing or exposure control in an imaging device, an image process such as color correction or outline enhancement in an image processing device, or any other processes.

The first embodiment of the invention has a face detecting unit, face information recording unit and face selecting unit.

The face detecting unit detects a face from an inputted image. The face detecting unit may be realized by any existing face detecting techniques so long as they can detect plural faces in the image.

The face information recording unit records the face previously detected by the face detecting unit and the detection history of this detection as associated with each other.

The face selecting unit selects a target face for processing, from the faces included in the image based upon the detection history. For example, the face selecting unit obtains, for each face detected from the image, the detection history agreeing with the face from the face information recording unit, and may select the face that is to be an object based upon the obtained detection history. In case where the detected face is not registered to the face information recording unit, the detection history of not being detected (i.e., the number of times of the detection is zero) is used.

The methods for selecting a face that is to be an object based upon the detection history include, as a simple example, a method for selecting a face based upon the number of times of detection. As another method, weighting is carried out for each detection by utilizing the date of the detection, the size of the face, the number of faces in the image, etc.; a face that is to be processed is selected based upon the detection frequency obtained as a result of the weighting. In this method, it is considered that the weighting is increased in case where the face is recently detected, where the size of the face is great, where there are a few faces in the image, etc., in order to calculate the detection frequency.

One or more embodiments of the invention may also include a face information updating unit that performs new registration and updating to the face information recording unit.

As described above, the face that is to be processed is selected and the new registration of the detected face and the updating of the detection history of the detected face can automatically be executed, whereby a user can use the function of the object determining device without doing a complicated registering operation.

Another embodiment includes an imaging device provided with the object determining device according to the first embodiment of the invention. The imaging device has an imaging unit and a control unit.

The object determining device selects a target face to be processed, from the image captured by the imaging unit based upon the detection history (as described above). Then, the control unit performs a control to the imaging device such as bringing the selected face into focus, adjusting an exposure through the control of a shutter speed or diaphragm, or changing an angle of view through the control of a zoom lens.

The second embodiment may include a mode changing unit, allowing the user to select from multiple modes. For example a first mode in which the shooting condition is adjusted to the face selected by the face selecting unit or a second control mode where the user selects the face for which the shooting condition is adjusted.

In yet another embodiment, a monitor is provided with the object determining device according to the first embodiment; wherein the monitor has an imaging unit and a notification unit.

Another embodiment of the invention is an object determining method for determining a target face for processing from plural faces included in an image.

An information processing device includes a step of detecting faces from an image; and a step of selecting a target face for processing, from the detected faces on the basis of the face information database in which the past detected faces and the detection history relating to the detections are stored as associated with each other Another embodiment of the invention provides a program for determining a target face for processing from plural faces included in an image. This program causes an information processing device to detect faces from an image and to select a target face for processing from the detected faces on the basis of the face information database in which the past detected faces and the detection history relating to the detections are stored as associated with each other.

BRIEF DESCRIPTION OF THE DRAWINGS

FIG. 2 shows a view of a data structure of face information according to an embodiment of the invention;

DETAILED DESCRIPTION

Several embodiments of the invention are illustratively explained in detail hereinafter with reference to the drawings.

Figure 1:
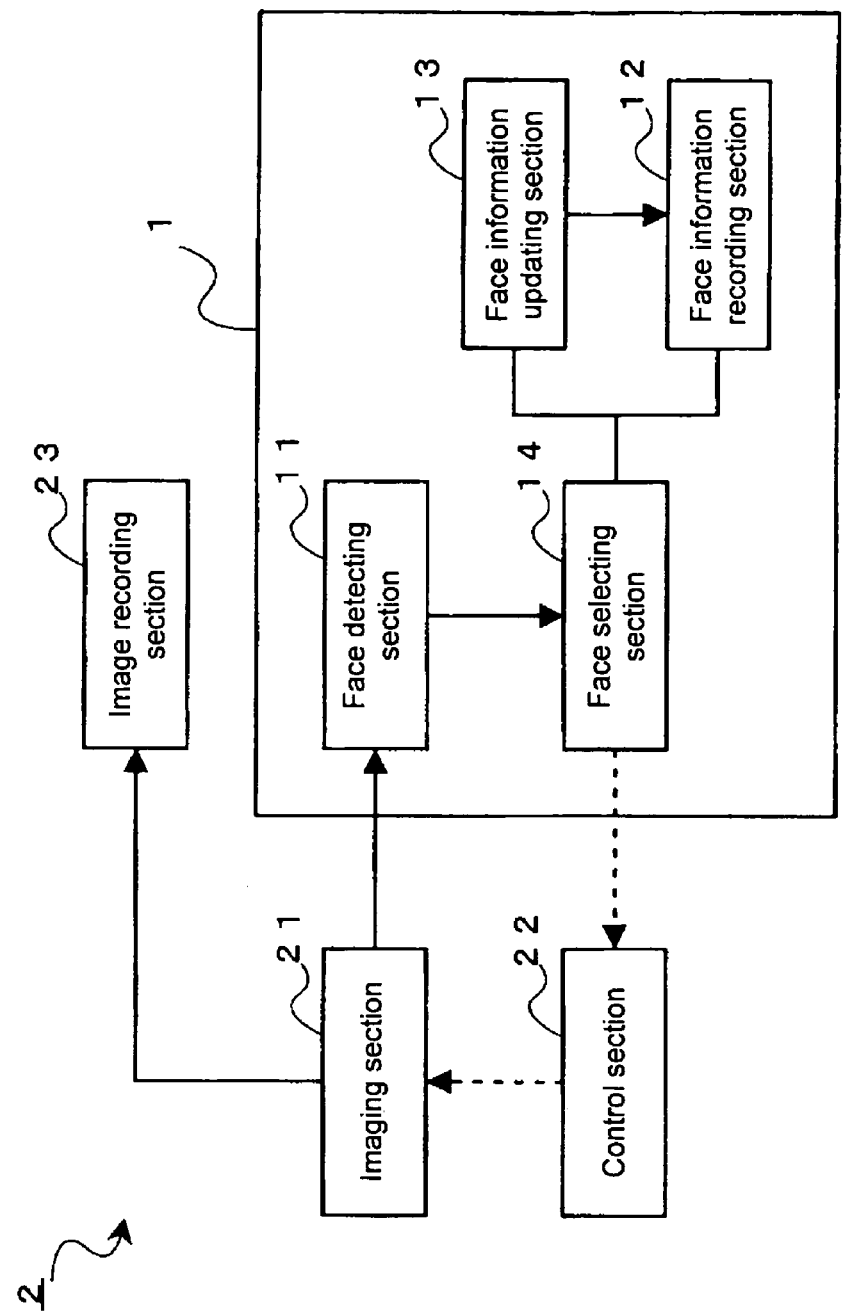
FIG. 1 shows a diagram of configurations of an imaging device and object determining device according to a first embodiment of the invention.

The first embodiment of the present invention is an imaging device provided with an object determining device. FIG. 1 is a functional block diagram of the imaging device 2. The imaging device 2 includes an object determining device 1, imaging section 21, a control section 22, and an image recording section 23.

The imaging device 2 records an image captured by the imaging section 21 into the image recording section 23 as digital data. Specifically, the imaging device 2 according to this embodiment is a so-called digital camera. The digital camera includes, in addition to a digital still camera, a digital video camera including a still image capturing function, or a camera attached to (incorporated into) a cellular phone, PDA (Personal Digital Assistance), personal computer, or the like.

The function of each section will be explained below.

The imaging section 21 includes an imaging lens, image sensor, frame memory, mechanical unit, motor, etc. (not shown).

The imaging lens includes, for example, a zoom lens for realizing a zoom function, a focus lens for bringing an optional subject into focus, etc.

The motor includes a zoom lens motor, focus motor, shutter motor, etc. A photoelectric conversion device such as a CCD (Charge Coupled Device) or CMOS (Complementary Metal Oxide Semiconductor) device is used as the image sensor.

At the imaging section 21, the image formed through the imaging lens including the focus lens is converted into an electrical signal and stored in the frame memory as a digital image.

The control section 22 controls the imaging section 21, i.e., it provides the imaging device a control for bringing a subject into focus, a control for adjusting an exposure through the control of a shutter speed or diaphragm, or a control for changing an angle of view through the control of the zoom lens.

The following explanation is made assuming that the control section 22 performs the focusing control as its representative function. In the case where the focusing is performed, the control section 22 uses, for example, a contrast system wherein the zoom lens at the imaging section 21 moves successively at a predetermined pitch and the focusing is achieved by obtaining the contrast of the captured image.

There are two methods concerning the object that is to be in focus; one is a method wherein the object that is to be in focus is a face selected by the object determining device 1 (described below), and the other is a method (auto-focusing) wherein the object that is to be in focus is a subject present in a predetermined area (focus area) in a screen.

These methods can be modified by a user's selection of the function. It is to be noted that the so-called auto-focusing function is referred to as a "manual" focusing method in this specification, since the user is required to capture the subject that is to be in focus in the focusing area, and the focusing method by the object determining device 1 is referred to as an "automatic" focusing method in this specification.

The image recording section 423 includes a non-volatile memory such as e.g., flash memory, FeRAM (Ferroelectric Random Access Memory), EPROM (Erasable Programmable Read Only Memory), or the like, or it can include a magnetic disk such as a hard disk.

The image recording section 23 may also include recording medium detachable from the imaging device 2. The image recording section 23 records the image data captured by the imaging section 21 and stored in the frame memory.

The object determining device 1 selects the face, which should be in focus, in the image captured by the imaging section 21. When the face that should be in focus is selected, the object determining device 1 reports the position of this face in the image to the control section 22.

The control section 22 provides a control for bringing the face into focus.

The object determining device 1 includes a face detecting section 11, face information recording section 12, face information updating section 13, and a face selecting section 14. The object determining device 1 realizes its function by the execution of the program stored in the memory. The function of each section of the object determining device 1 will be explained below.

The face detecting section 11 detects a human face in the inputted image and outputs the number and position of the detected face. In this embodiment, the face detecting section 11 detects a face according to template matching based upon the parts of the face (eyes, nose, ears, etc.).

A face may be detected by utilizing any technique such as e.g., a method for detecting the area having a skin color as the face area, a method for detecting the face area based upon the difference between light and shade, a method using a neutral network, etc.

The face information recording section 12 includes a memory (not shown). It records the face detected by the face detecting section 11 with the history involved with the detection. FIG. 2 is a table for explaining the data structure of the data recorded by the face information recording section 12, wherein information relating to three persons A, B and C is recorded.

The face information recording section 12 holds the information of the characteristic of the face, thumbnail image, and detection history for each face. The information about the characteristic of the face includes the positional relationship of the characteristic points such as an organ of the face (nose, eyebrows, eyes, mouth, cheeks, etc.) or the periodicity and orientation of the variable density value in the vicinity of the characteristic point.

The use of the information about the characteristic of the face makes it possible to specify a person from the face image.

The detection history includes the date and time when each detection is made, the size of the detected face image, the number of persons included in the image, and the operation mode of the imaging device 2 when the detection is made, in addition to the accumulated number of times of the detection. Since the accumulated number of times of the detection and the information relating to each detection are held as described above, the selection of a face based upon the detection history can be carried out considering a degree of attention to the detected face (described below).

The face information recording section 12 also holds the thumbnail image of the detected face. When the user edits or deletes the recorded information, the thumbnail image is displayed together with the detection history, whereby the user easily grasps that the displayed detection history is for which face. Therefore, the convenience for the user is enhanced.

The face information updating section 13 updates the face information recording section 12 by using the detection history and the information about the characteristic of the face detected by the face detecting section 11.

In the case where the detected face is not recorded in the face information recording section 12, the face information updating section 13 newly registers this face to the face information recording section 12.

The face selecting section 14 selects a face that is to be an object from the faces detected by the face detecting section 11. The face selecting section 14 extracts the information about the characteristic of the detected face, compares the information about the characteristic of the detected face and the information about the characteristic of the face recorded in the face information recording section 12 by using a face identification technique, and obtains the detection history of the detected face. The usable techniques for the face identification include e.g., a template matching method, subspace method, neutral network method, etc.

The face selecting section 14 then selects the face that is to be an object based upon the obtained detection history. In the case where only one face is included in the image, the face selecting section 14 selects this face.

Now, a process executed by the object determining device 1 and the imaging device 2 will be explained with reference to the flowcharts shown in FIGS. 3 to 5.

Figure 3:
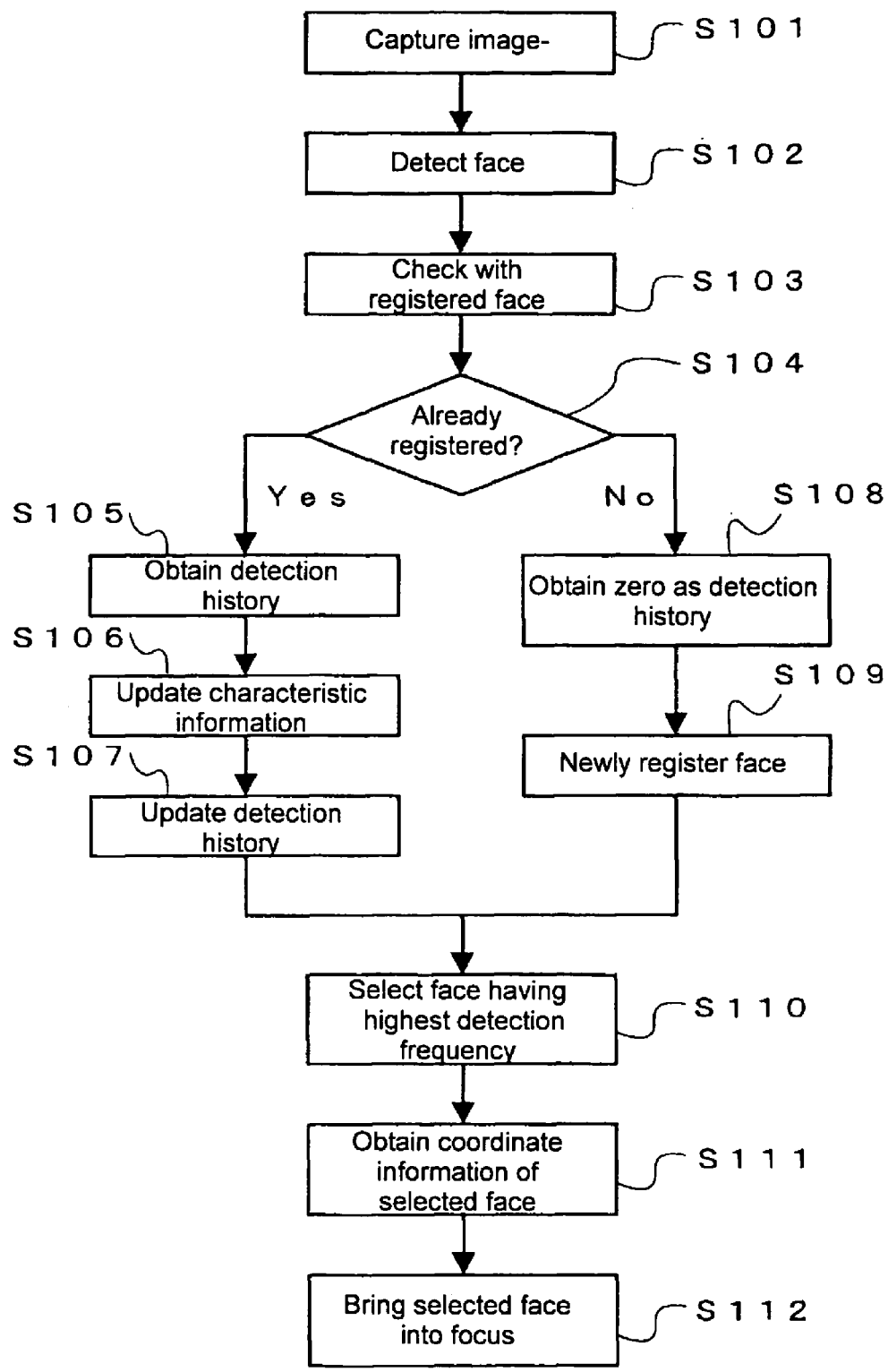
FIG. 3 shows a flowchart illustrating a flow of a process of the imaging device according to an embodiment of the invention.

FIG. 3 is a flowchart showing a process in the mode for selecting the face (i.e., the face selecting mode), which should be in focus by the object determining device 1, from the image captured by the imaging section 21.

At step S101, the imaging section 21 captures an image, and stores the image data to the frame memory. At step S102, the face detecting section 11 receives the captured image data and detects the number and position (range) of the faces present in the image.

At step S103, the face selecting section 14 determines whether the face information and detection history are registered in the face information recording section 12 for each of the detected faces.

In this case, it determines whether the detected face has already been registered or not by using the face identification technique as described above.

When it is determined at step S104 that the detected face has already been registered in the face information recording section 12, the program proceeds to step S105.

At step S105, the face selecting section 14 obtains the detection history of the detected face. At step S106, the face information updating section 13 updates the information of the characteristic of the face stored in the face information recording section 12 by using the information of the characteristic of the detected face.

As the information of the characteristic of the face increases, the identification precision is enhanced, so that the face can be correctly recognized even under various conditions such as e.g., an expression, a direction of a face, illumination, etc.

At step S107, the face information updating section 13 updates the detection history stored in the face information recording section 12 by using the information relating to this-time (i.e., current) detection.

When it is determined at step S104 that the detected face has not been registered in the face information recording section 12, the program proceeds to step S108 where the face selecting section 14 obtains the information of "no detection history" as the detection history.

Then, at step S109, the face information updating section 13 newly registers the information of the characteristic of the face and detection history to the face information recording section 12. Therefore, the detection history can be utilized for this face at the next and following detections.

The face selecting section 14 obtains the detection history for all the detected faces at step S105 or step S108 as described above. Then, at step S110, the face selecting section 14 selects the face having the highest detection frequency as the face that is to be an object.

Notably, various methods can be employed for obtaining the detection frequency from the detection history. For example, the number of past detections can be obtained and used as the detection frequency. Further, in one or more embodiments, the detection frequency considering the degree of attention to the face in the past detections (image-capture) is calculated.

Specifically, weighting is performed according to the degree of attention for each of the past detections, and the number of times of detection obtained by weighting is used as the detection frequency.

For example, the weighting is increased for the face whose detected date is the latest. This is because the degree of attention is considered to be high as the image-capture is of a recent date. Moreover, the weighting is increased as the size of the face occupied in the image upon the detection is great. This is because the degree of attention is considered to be high as the close-up photo of the face is taken, and the degree of attention is considered to be low as the face is small in the captured image.

Further, the weighting is increased as the number of persons in the image is few upon the detection. This is because the degree of attention of the face of the image-captured single person is considered to be high, and the degree of attention of each face of many image-captured faces in a group photo is considered to be low.

The weighting may be performed in accordance with the operation mode upon the detection. The face detected in the mode (later-described second operational mode) in which a user manually determines the face that is to be in focus is the face that the user voluntarily selects, so that the degree of attention of this face is considered to be higher than that of the face selected by the object determining device.

It is to be noted that these weightings can be used in combination.

At step S111, the face selecting section 14 obtains the coordinate in the image of the selected face, and reports the same to the control section 22. At step S112, the control section 22 performs a focusing control for bringing the subject present at the reported coordinate into focus.

As described above, the imaging device 2 can determine the face, which should be in focus, based upon the detection history, even if there are plural faces in the image. Further, the detection history is updated every time a face is detected.

Therefore, a user can select the face, which should be in focus, without manually doing a complicated registering operation. Moreover, the information of a characteristic of a face is updated for every detection, whereby the face identification precision is automatically enhanced during repeated use.

When the information of the characteristic of a face is updated at step S106, the faces stored in the face information recording section 12 as being different from each other sometimes turned out to be the face of the same person. For example, the face turning to the left and the face turning to the right of the same person happen to be determined as the faces of different persons and stored in the face information recording section 12 as being different from each other.

In this case, as the information of the characteristic of the face of this person increases, the face identification can be precisely performed for the face in various directions. Therefore, the face turning to the right and the face turning to the left determined at the beginning to be the faces of different persons turn out to be the faces of the same person.

It is inconvenient that the faces of the same person are registered in the face information recording section 12 as being different from each other. Therefore, the object determining device 1 performs, at a predetermined timing, a process for confirming whether or not the faces of the same person are registered as being different from each other in the face information recording section 12.

In the case where the faces of the same person are registered as being different from each other, the information of the characteristic of the face and the detection history for the each face are collected and these faces are re-registered as a single face.

The faces of the same person registered as being different from each other are re-registered as a single face as described above, with the result that the precision in the face identification is enhanced. Since the detection history is correctly stored, the precision in the selecting process based upon the detection history is also enhanced. It is to be noted that the process executed by the object determining device 1 for confirming whether or not the faces of the same person are registered as being different from each other is executed every time the face information updating section 13 updates the information of a characteristic of a face, or every time the face information updating section 13 updates predetermined number of times, or when the execution is issued by a user.

Further, the object determining device 1 may perform, at a predetermined timing, a process for confirming whether or not the faces of plural persons are registered as a single face in the face information recording section 12. In case where the faces of plural persons are registered as a single face, the information of a characteristic of a face and detection history for each face are separated, and these faces are re-registered as plural faces.

The second operational mode is a mode in which the control section 22 brings the subject present at a predetermined position (e.g., the center of the screen) in the image into focus. In the second operational mode, a user once captures the subject, which the user intends to bring into focus, in a focusing area, decides the composition with the focus-lock state, and takes an image.

Figure 4:
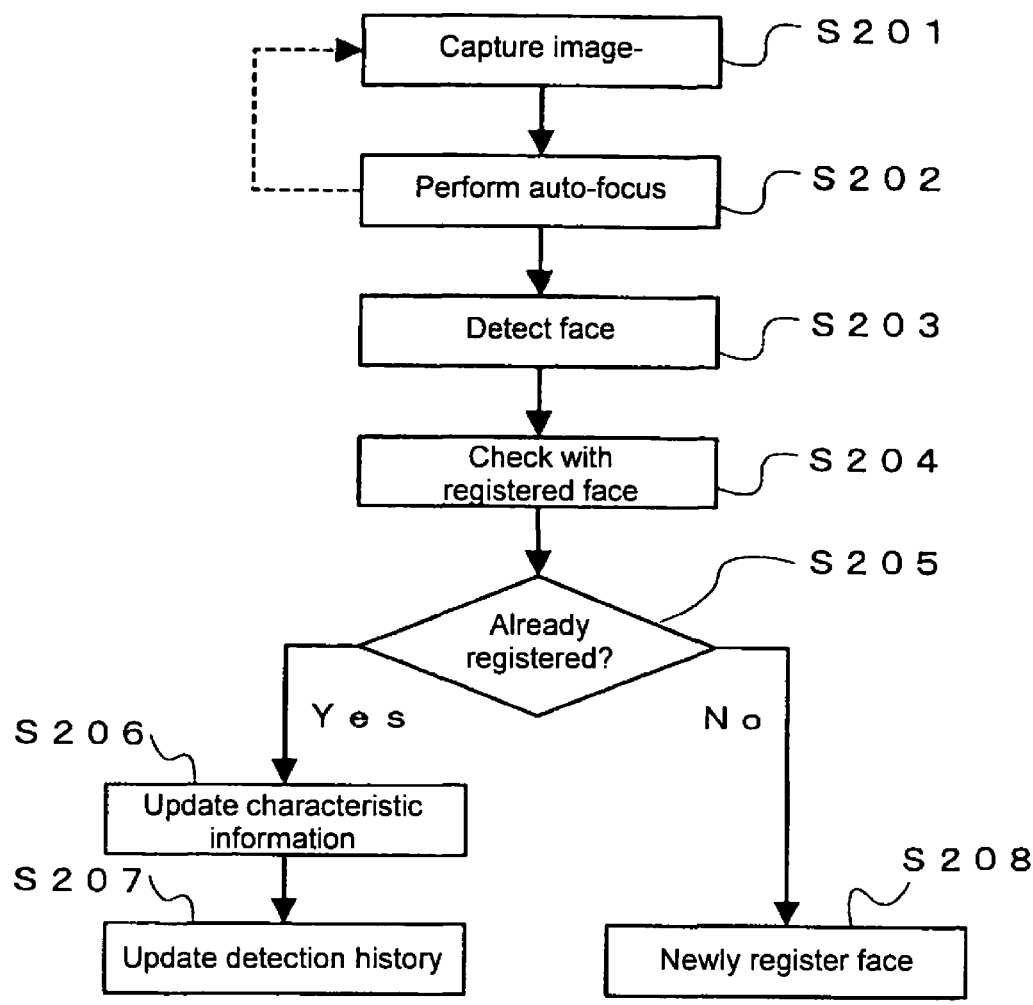
FIG. 4 shows a flowchart illustrating a flow of a process of the imaging device according an embodiment of the invention.
Figure 5:
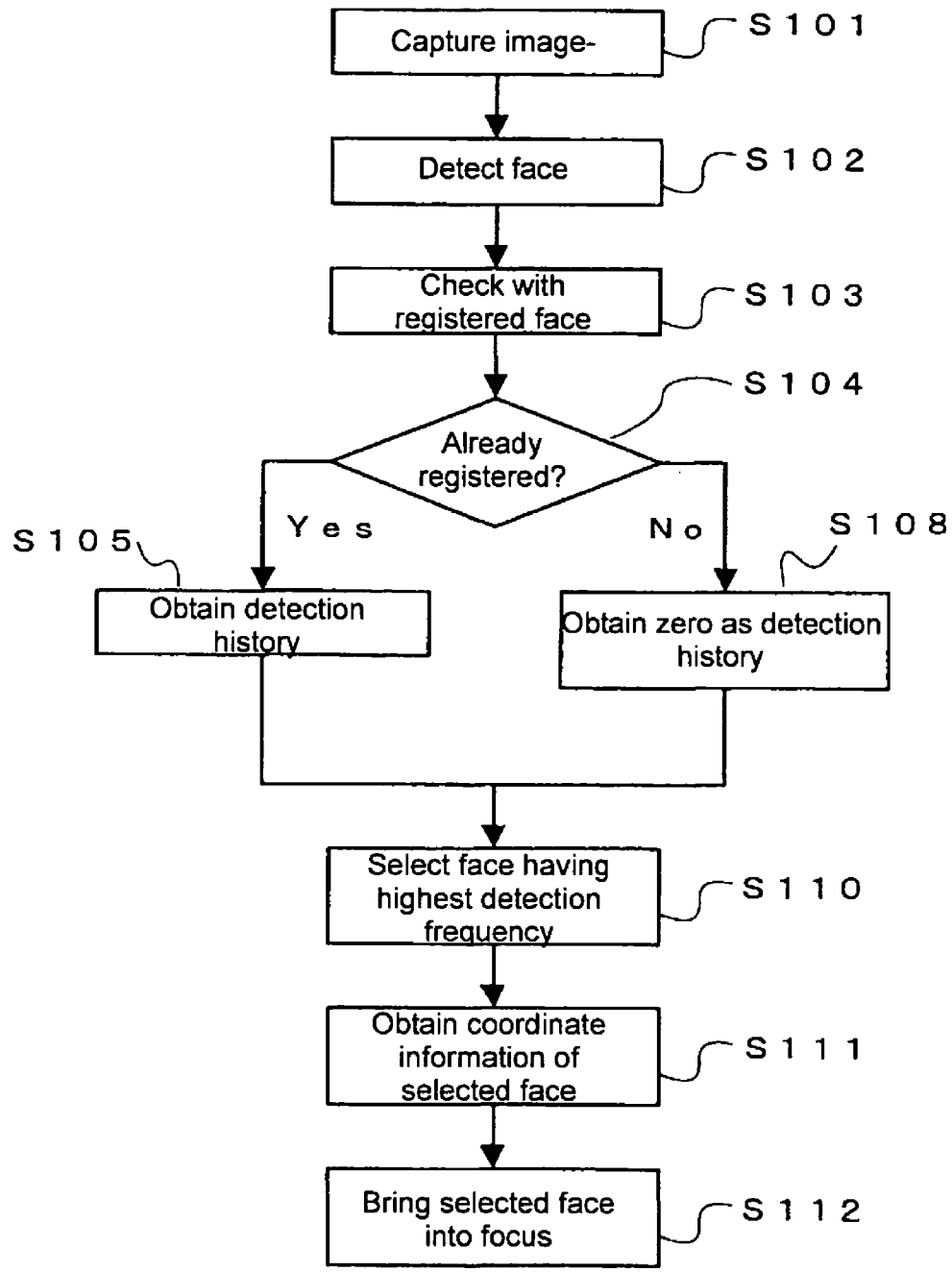
FIG. 5 shows a flowchart illustrating a flow of a process of the imaging device according to an embodiment of the invention.

FIG. 4 is a flowchart showing a process of the imaging device 2 and the object determining device 1 in the second operational mode.

At step S201, the imaging section 21 captures an image, and at step S202, the control section 22 controls the imaging section 21 such that the subject in the focus area is in focus. When the subject in the focus area is in focus, the program proceeds to step S203 where a face is detected from the image (step S203), and then, it is determined whether the detected face is registered in the face information recording section 12 (steps S204 to S205).

In the second operational mode, a user manually determines the subject that is to be in focus, so that the object determining device 1 is not required to determine the face that should be in focus. Therefore, the object determining device 1 does not obtain the detection history from the face information recording section 12. However, it updates the face information recording section 12. Specifically, in case where the detected face is registered in the face information recording section 12, the information about the characteristic of the face and the detection history are updated (steps S206, 207). In case where the detected face is not registered in the face information recording section 12, the detected face is newly registered in the face information recording section 12 (step S208).

As described above, a user can manually determine the subject that is to be in focus and the object determining device 1 can accumulate the information about the characteristic of the face and the detection history. Specifically, even in the case where the face information is not recorded in the face information recording section 12, the face information can be accumulated during the normal use as a digital camera. Accordingly, while a user uses the object determining device 1 as a normal digital camera, the user can utilize the face selecting function using the function of the object determining device 1 without doing beforehand a complicated registering operation for the face selection.

The third operational mode is a mode in which the object determining device 1 selects the face, which is to be brought into focus, based upon the detection history, but it does not perform the registration and updating of the face information. FIG. 5 is a flowchart showing the operation of the imaging device 2 and the object determining device 1 in the third operational mode.

The third operational mode is approximately the same as the first operational mode. The difference between the third operational mode and the first operational mode is that steps S106, S107, and S109 are omitted from the third operational mode. This operational mode can be selected for example, in the case where the imaging device 2 is used temporarily or in the case where the user considers that the face information recording section 12 is in an optimum state and it is unnecessary to update it.

The following functions may be added to the imaging device 2 according to the first embodiment.

One of the functions is to delete the unnecessary information of the face information stored in the face information recording section 12, which is a face information deleting function for securing the memory capacity. The object determining device 1 calculates, at a predetermined timing, the detection frequency of the face recorded in the face information recording section 12, and when the detection frequency is less than the predetermined frequency, it automatically deletes this face information. The detection frequency can be calculated by various methods as explained above. It is to be noted that the predetermined frequency may be a frequency given beforehand, or may be dynamically changed according to the free memory capacity.

This face information deleting function may be performed at the timing when the user instructs its execution, or may be performed when the free memory capacity becomes small. Further, in order to prevent the face information whose deletion is not desired by the user from being automatically deleted, a function for inhibiting the deletion of the registered face given by a user may be added.

Another function is a face information database selecting function in which the face information recording section 12 includes plural databases and a user can select the database that is to be used. The detection history different for every database is held, whereby even if the imaging device 2 is used by plural persons, the face selection according to the history of use of each person can be made. Even if a single person uses the imaging device 2, the face selection suitable for the purpose is made possible by switching the database for every purpose of the use.

Figure 6:
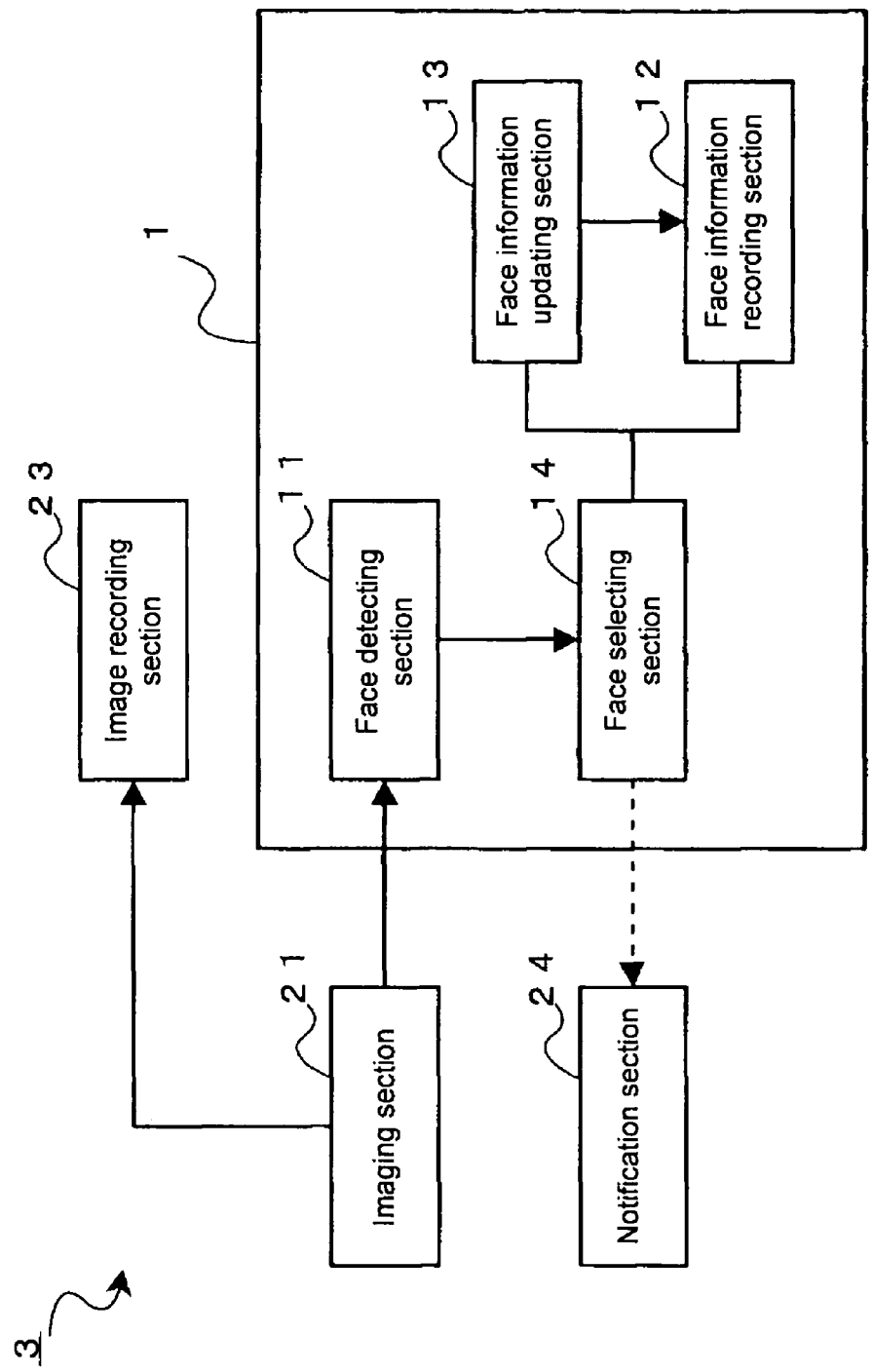
FIG. 6 shows a diagram of configurations of a monitor and object determining device according to an embodiment of the invention.

The second embodiment of the invention is a monitor provided with the object determining device. FIG. 6 is a functional block diagram of a monitor 3. The monitor 3 has the object determining device 1, imaging section 21, notification section 24, and image recording section 23. The components same as those in the first embodiment are designated by the same numerals, and the description thereof will not be repeated.

The monitor 3 records the moving image captured by the imaging section 21 to the image recording section 23, and when a predetermined person is captured, the notification section 24 provides a report. The monitor 3 according to this embodiment is, for example, installed at the place to which only a specific person makes a visit, and can be used for giving notification when a suspicious person comes to this place. Alternately, the monitor 3 according to this embodiment is, for example, installed at the place where an unspecified number of persons make a visit, such as a store, and can be used for giving notification when a regular customer comes to this place.

The notification section 24 provides a notification to a user when the object determining device 1 selects a face. It attracts the user's attention by light or sound, and reproduces the captured moving image.

The object determining device 1 selects the face that is to be an object from the image captured by the imaging section 21 based upon the detection history. In case where there are plural faces present in the image, it may select two or more faces as an object to be processed. Further, in the case where there is no face present that should be selected as the object to be processed even if there are faces in the image, it does not execute the face selection. Specifically, the object determining device 1 according to this embodiment selects the face as an object to be processed only when there is a face in the image whose detection frequency satisfies the predetermined condition.

Figure 7:
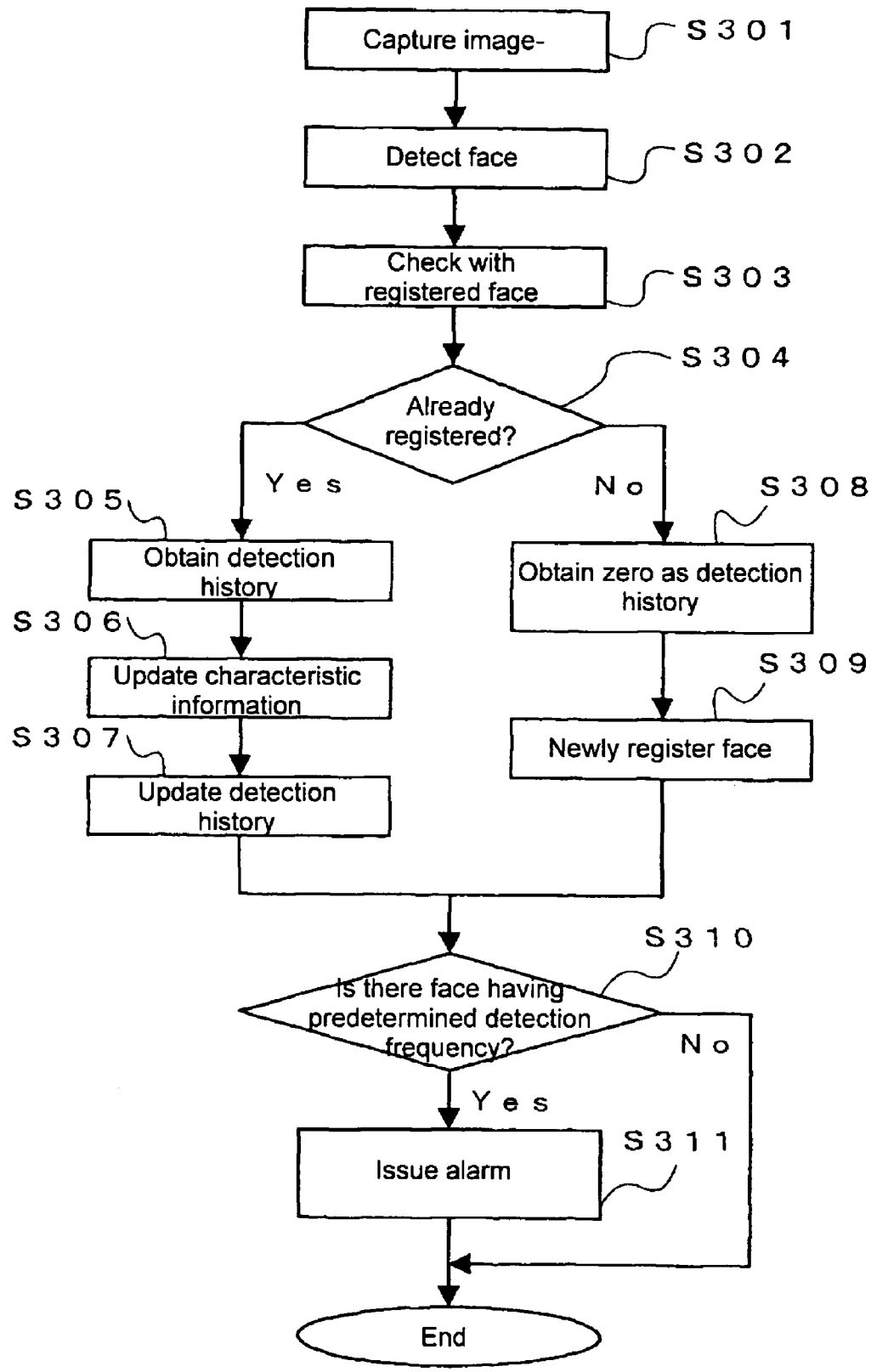
FIG. 7 shows a flowchart illustrating a flow of a process of the monitor according to an embodiment of the invention.

FIG. 7 is a flowchart showing a flow of the process of the monitor 3. At step S301, the imaging section 21 captures a moving image. At step S302, a face is detected from the captured image. Since the image captured by the imaging section 21 is a moving image, the face detection is performed at predetermined time interval.

The processes from step S303 to step S309 are the same as those in the first embodiment, so that these processes will be briefly explained. It is checked whether or not the detected face is registered in the face information recording section 12 (steps S303 to S304), the detection history is obtained (steps S305, S308), and updates (steps S306, S307) or newly registers (step S309) the face information.

As described above, the face selecting section 14 obtains the detection frequency of the detected face, and determines at step S310 whether or not the face satisfying the predetermined detection frequency is present in the image. If the monitor 3 is used at a store for providing a notification when a regular customer makes a visit, the face selecting section 14 determines whether the face having the detection frequency higher than the predetermined value is present or not. On the contrary, if the monitor 3 is used for sensing a suspicious person, the face selecting section 14 determines whether the face having the detection frequency lower than the predetermined value is present or not.

At step S311, the monitor 3 notifies a user of the situation in the case where the face having the predetermined detection frequency is present in the image.

As described above, the monitor 3 updates the detection history while monitoring, whereby it can make a suitable notification determination based upon the detection history. For example, as for the monitor for a store that provides notification when a regular customer makes a visit, it does not provide a notification at the beginning since the detection history is not registered to the face information recording section 12, but the face information is accumulated as the detection of the face is increased, and hence, it can provide a notification when detecting a regular customer who makes a frequent visit.

As for a monitor for sensing a suspicious person, a registration and updating of face information are only performed at the beginning with the function for giving notification when a suspicious person is sensed turned off, whereby face information (characteristic information and detection history) of a specific person, not a suspicious person, is accumulated. Then, the notification function is turned on when face information is accumulated to some degree, whereby it functions as a monitor for sensing a suspicious person.

As described above, even if a user does not register beforehand the information of the face that should be detected, a suitable detection can be made possible with a repeated use of a monitor.

Although the first embodiment illustrates the case where the object determining device is mounted to a digital camera for selecting the face that should be brought into focus, the object determining device may be mounted to a digital video camera that captures a moving image wherein a face that is to be an object of a control such as focusing may be selected. In this case, the detection of the face may be performed during the recording of the moving image at a predetermined interval. Further, the registration of the detection history of the face may be performed for example, only when the face turns generally to the front. This is because the face turning to the front is considered to be the face having the high degree of attention.

What is claimed is:

1. An imaging device provided with an object determining device for selecting a target face for processing from plural faces included in an image, said object determining device comprising a face detecting unit that detects the faces from the image, a face information recording unit that records a face detected in the past by the face detecting unit and records detection history relating to the face detected in the past as being associated with each other and a face selecting unit that selects the target face for processing from the faces included in the image based upon the recorded detection history, said imaging device comprising:

an imaging unit;

a control unit that controls a shooting condition of the imaging device with respect to the face selected by the object determining device from the image captured by the imaging unit; and a control mode changing unit that can change a first control mode in which the shooting condition is adjusted to the face selected by the face selecting unit and a second control mode in which a user determines the face to which the shooting condition is adjusted, wherein
during the second control mode, in the case where the face determined by the user as the face for which the shooting condition is adjusted is not recorded in the face information recording unit, the face is newly registered to the face information recording unit, and in the case where the face is present in the face information recording unit, the detection history of the face recorded to the face information recording unit is updated.

* * * * *